US009336280B2

(12) United States Patent
Lightner et al.

(10) Patent No.: US 9,336,280 B2
(45) Date of Patent: May 10, 2016

(54) METHOD FOR ENTITY-DRIVEN ALERTS BASED ON DISAMBIGUATED FEATURES

(71) Applicant: QBASE, LLC, Reston, VA (US)

(72) Inventors: Scott Lightner, Leesburg, VA (US); Franz Weckesser, Spring Valley, OH (US)

(73) Assignee: QBASE, LLC, Reston, VA (US)

( * ) Notice: Subject to any disclaimer, the term of this patent is extended or adjusted under 35 U.S.C. 154(b) by 0 days.

(21) Appl. No.: 14/558,121

(22) Filed: Dec. 2, 2014

(65) Prior Publication Data

US 2015/0154195 A1 Jun. 4, 2015

Related U.S. Application Data

(60) Provisional application No. 61/910,773, filed on Dec. 2, 2013.

(51) Int. Cl.
*G06F 17/30* (2006.01)

(52) U.S. Cl.
CPC ........ *G06F 17/3053* (2013.01); *G06F 17/3071* (2013.01)

(58) Field of Classification Search
CPC ................................................ G06F 17/30283
See application file for complete search history.

(56) References Cited

U.S. PATENT DOCUMENTS

| | | | |
|---|---|---|---|
| 6,128,660 A | 10/2000 | Grimm et al. | |
| 6,178,529 B1 | 1/2001 | Short et al. | |
| 6,266,781 B1 | 7/2001 | Chung et al. | |
| 6,353,926 B1 | 3/2002 | Parthesarathy et al. | |
| 6,457,026 B1 * | 9/2002 | Graham et al. | 715/234 |
| 6,460,036 B1 | 10/2002 | Herz | |
| 6,738,759 B1 | 5/2004 | Wheeler et al. | |
| 6,832,737 B2 | 12/2004 | Karlsson et al. | |
| 7,058,846 B1 | 6/2006 | Kelkar et al. | |
| 7,370,323 B2 | 5/2008 | Marinelli et al. | |
| 7,421,478 B1 | 9/2008 | Muchow | |
| 7,447,940 B2 | 11/2008 | Peddada | |
| 7,543,174 B1 | 6/2009 | van Rietschote et al. | |
| 7,593,940 B2 | 9/2009 | Gruhl et al. | |

(Continued)

FOREIGN PATENT DOCUMENTS

WO 2013/003770 A2 1/2013

OTHER PUBLICATIONS

Vizard, The Rise of In-Memory Databases, Jul. 13, 2012, p. 1.*

(Continued)

*Primary Examiner* — Albert Phillips, III
(74) *Attorney, Agent, or Firm* — Eric Sophir; Dentons US LLP (57) ABSTRACT

A method for entity-driven alerts based on disambiguated features, is disclosed. According to an embodiment, disclosed method may refer to entity-driven alerts based on trending or new knowledge of a disambiguated feature. The alerts may be sent to a user when new knowledge is discovered about the disambiguated feature, a new association (such as new features, facts, quotations, or topic IDs related, among others) with the feature of interest, and/or new trending changes are emerging about the feature of interest. According to various embodiments, method for entity-driven alerts based on disambiguated features may reduce the number of false positives resulting in a normal search query. Which in turn, may increase the efficiency of monitoring, allowing for broadened universe of alerts.

14 Claims, 4 Drawing Sheets

(56) References Cited

U.S. PATENT DOCUMENTS

| | | | |
|---|---|---|---|
| 7,681,075 B2 | 3/2010 | Havemose et al. | |
| 7,818,615 B2 | 10/2010 | Krajewski et al. | |
| 7,899,871 B1 | 3/2011 | Kumar et al. | |
| 7,917,393 B2 | 3/2011 | Valdes et al. | |
| 7,970,808 B2 | 6/2011 | Konig et al. | |
| 8,055,933 B2 | 11/2011 | Jaehde et al. | |
| 8,122,026 B1* | 2/2012 | Laroco et al. | 707/737 |
| 8,326,788 B2 | 12/2012 | Allen et al. | |
| 8,332,258 B1* | 12/2012 | Shaw | 705/7.31 |
| 8,341,622 B1 | 12/2012 | Eatough | |
| 8,345,998 B2 | 1/2013 | Malik et al. | |
| 8,356,036 B2 | 1/2013 | Betchel et al. | |
| 8,375,073 B1 | 2/2013 | Jain | |
| 8,423,522 B2 | 4/2013 | Lang et al. | |
| 8,429,099 B1 | 4/2013 | Perkowitz et al. | |
| 8,429,256 B2 | 4/2013 | Vidal et al. | |
| 8,726,267 B2 | 5/2014 | Li et al. | |
| 8,751,505 B2 | 6/2014 | Carmel et al. | |
| 8,762,375 B2 | 6/2014 | Brdiczka et al. | |
| 8,782,018 B2 | 7/2014 | Shim et al. | |
| 8,856,099 B1 | 10/2014 | Lasko et al. | |
| 8,924,319 B1 | 12/2014 | Bearman | |
| 8,995,717 B2 | 3/2015 | Cheng et al. | |
| 9,009,153 B2 | 4/2015 | Khan et al. | |
| 9,025,892 B1 | 5/2015 | Lightner et al. | |
| 9,032,387 B1 | 5/2015 | Hill et al. | |
| 2001/0037398 A1 | 11/2001 | Chao et al. | |
| 2002/0165847 A1 | 11/2002 | McCartney et al. | |
| 2002/0174138 A1 | 11/2002 | Nakamura | |
| 2003/0028869 A1 | 2/2003 | Drake et al. | |
| 2003/0112792 A1 | 6/2003 | Cranor et al. | |
| 2003/0158839 A1 | 8/2003 | Faybishenko et al. | |
| 2003/0182282 A1 | 9/2003 | Ripley | |
| 2004/0027349 A1 | 2/2004 | Landau et al. | |
| 2004/0143571 A1 | 7/2004 | Bjornson et al. | |
| 2004/0153869 A1 | 8/2004 | Marinelli et al. | |
| 2004/0205064 A1 | 10/2004 | Zhou et al. | |
| 2004/0215755 A1 | 10/2004 | O'Neill | |
| 2005/0192994 A1 | 9/2005 | Caldwell et al. | |
| 2006/0101081 A1 | 5/2006 | Lin et al. | |
| 2006/0122978 A1 | 6/2006 | Brill et al. | |
| 2006/0294071 A1 | 12/2006 | Weare et al. | |
| 2007/0005639 A1 | 1/2007 | Gaussier et al. | |
| 2007/0005654 A1 | 1/2007 | Schachar et al. | |
| 2007/0073708 A1* | 3/2007 | Smith et al. | 707/10 |
| 2007/0174167 A1 | 7/2007 | Natella et al. | |
| 2007/0203693 A1 | 8/2007 | Estes | |
| 2007/0203924 A1 | 8/2007 | Guha et al. | |
| 2007/0240152 A1 | 10/2007 | Li et al. | |
| 2007/0250519 A1 | 10/2007 | Fineberg et al. | |
| 2007/0282959 A1 | 12/2007 | Stern | |
| 2008/0010683 A1 | 1/2008 | Baddour et al. | |
| 2008/0027920 A1 | 1/2008 | Schipunov et al. | |
| 2009/0019013 A1 | 1/2009 | Tareen et al. | |
| 2009/0043792 A1 | 2/2009 | Barsness et al. | |
| 2009/0049038 A1 | 2/2009 | Gross | |
| 2009/0089626 A1 | 4/2009 | Gotch et al. | |
| 2009/0094484 A1 | 4/2009 | Son et al. | |
| 2009/0144609 A1* | 6/2009 | Liang et al. | 715/230 |
| 2009/0216734 A1* | 8/2009 | Aghajanyan et al. | 707/5 |
| 2009/0240682 A1 | 9/2009 | Balmin et al. | |
| 2009/0292660 A1 | 11/2009 | Behal et al. | |
| 2009/0299999 A1 | 12/2009 | Loui et al. | |
| 2009/0322756 A1 | 12/2009 | Robertson et al. | |
| 2010/0077001 A1 | 3/2010 | Vogel et al. | |
| 2010/0138931 A1 | 6/2010 | Thorley et al. | |
| 2010/0161566 A1 | 6/2010 | Adair et al. | |
| 2010/0223264 A1 | 9/2010 | Bruckner et al. | |
| 2010/0235311 A1 | 9/2010 | Cao et al. | |
| 2010/0274785 A1 | 10/2010 | Procopiuc et al. | |
| 2011/0047167 A1 | 2/2011 | Caceres | |
| 2011/0071975 A1 | 3/2011 | Friedlander et al. | |
| 2011/0093471 A1 | 4/2011 | Brockway et al. | |
| 2011/0119243 A1 | 5/2011 | Diamond et al. | |
| 2011/0125764 A1 | 5/2011 | Carmel et al. | |
| 2011/0282888 A1 | 11/2011 | Koperski et al. | |
| 2011/0296397 A1 | 12/2011 | Vidal et al. | |
| 2012/0016875 A1 | 1/2012 | Jin et al. | |
| 2012/0030220 A1 | 2/2012 | Edwards et al. | |
| 2012/0059839 A1 | 3/2012 | Andrade et al. | |
| 2012/0102121 A1 | 4/2012 | Wu et al. | |
| 2012/0117069 A1 | 5/2012 | Kawanishi et al. | |
| 2012/0131139 A1 | 5/2012 | Siripurapu et al. | |
| 2012/0246154 A1 | 9/2012 | Duan et al. | |
| 2012/0310934 A1 | 12/2012 | Peh et al. | |
| 2012/0323839 A1 | 12/2012 | Kiciman et al. | |
| 2013/0132405 A1 | 5/2013 | Bestgen et al. | |
| 2013/0166480 A1 | 6/2013 | Popescu et al. | |
| 2013/0166547 A1 | 6/2013 | Pasumarthi et al. | |
| 2013/0290232 A1 | 10/2013 | Tsytsarau et al. | |
| 2013/0303198 A1 | 11/2013 | Sadasivam et al. | |
| 2013/0325660 A1* | 12/2013 | Callaway | 705/26.35 |
| 2013/0326325 A1* | 12/2013 | De et al. | 715/230 |
| 2014/0013233 A1 | 1/2014 | Ahlberg et al. | |
| 2014/0022100 A1 | 1/2014 | Fallon et al. | |
| 2014/0089237 A1* | 3/2014 | Adibi | 706/12 |
| 2014/0156634 A1 | 6/2014 | Buchmann et al. | |
| 2014/0244550 A1 | 8/2014 | Jin et al. | |
| 2014/0255003 A1* | 9/2014 | Abramson | 386/240 |
| 2014/0280183 A1* | 9/2014 | Brown et al. | 707/741 |
| 2014/0351233 A1 | 11/2014 | Crupi et al. | |
| 2015/0074037 A1 | 3/2015 | Sarferaz | |
| 2015/0154079 A1 | 6/2015 | Lightner et al. | |
| 2015/0154264 A1 | 6/2015 | Lightner et al. | |
| 2015/0154297 A1 | 6/2015 | Lightner et al. | |

OTHER PUBLICATIONS

International Search Report and Written Opinion dated Mar. 6, 2015 corresponding to International Patent Application No. PCT/US2014/067993, 9 pages.
International Search Report and Written Opinion dated Mar. 10, 2015 corresponding to International Patent Application No. PCT/US2014/067999, 10 pages.
International Search Report and Written Opinion of the International Searching Authority dated Apr. 15, 2015 corresponding to International Patent Application No. PCT/US2014/068002, 10 pages.
International Search Report and Written Opinion dated Feb. 24, 2015 corresponding to International Patent Application No. PCT/US2014/067918, 10 pages.
International Search Report and Written Opinion dated Mar. 3, 2015 corresponding to International Patent Application No. PCT/US2014/067921, 10 pages.
Tunkelang, A "Faceted Search," Morgan & Claypool Publ., 2009, pp. i-79.
Schuth, A, et al., "Universiy of Amsterdam Data Centric Ad Hoc Faceted Search Runs," ISLA, 2012, pp. 155-160.
Tools, Search Query Suggestions using ElasticSearch via Shingle Filter and Facets, Nov. 2012, pp. 1-12.
Wang et al., "Automatic Online News Issue Construction in Web Environment,"WWW 2008/Refereed Track: Search—Applications, Apr. 21-25, 2008—Beijing, China, pp. 457-466.
Blei et al., "Latent Dirichlet Allocation" Journal of Machine Learning Research 3 (2003), pp. 993-1022.
Chuang et al., "A Practical Web-based Approach to Generating Topic Hierarchy for Text Segments," CIKM '04 Nov. 8-13, 2004, Washington, DC, USA, Copyright 2004 ACM 1-58113-874-0/04/0011, pp. 127-136.
International Search Report and Written Opinion of the International Searching Authority dated Apr. 15, 2015, corresponding to International Patent Application No. PCT/2014/067994, 9 pages.

* cited by examiner

METHOD FOR ENTITY-DRIVEN ALERTS BASED ON DISAMBIGUATED FEATURES

CROSS-REFERENCE TO RELATED APPLICATIONS

This application claims the benefit of U.S. Provisional Application No. 61/910,773, entitled "Method For Entity-Driven Alerts Based on Disambiguated Features," filed on Dec. 2, 2013, which is incorporated herein by reference in its entirety.

This application is related to U.S. application Ser. No. 14/558,254, entitled "DESIGN AND IMPLEMENTATION OF CLUSTERED IN-MEMORY DATABASE," filed Dec. 2, 2014; and U.S. application Ser. No. 14/558,179, entitled "ALERTING SYSTEM BASED ON NEWLY DISAMBIGUATED FEATURES," filed Dec. 2, 2014; each of which are hereby incorporated by reference in their entirety.

FIELD OF THE DISCLOSURE

The present disclosure relates in general to databases; and, more particularly, to data management systems and alerting systems.

BACKGROUND

A well-designed meta-analysis can provide valuable information for researchers, policy-makers, or data analysts in general. These users face an overwhelming amount of information, even in narrow areas of interest. In response, search engines designed to send alerts are frequently employed on large volumes of information. However, there are many critical caveats in performing and interpreting such large amount of information, and thus many ways in which meta-analyses can yield misleading information. To further reduce information overload, users may only want to be alerted when new trends emerge about an entity.

Searching information about entities (i.e. people, locations, organizations) in a large amount of documents, including sources such as a network, may often be ambiguous, which may lead to imprecise text processing functions, imprecise association of features during a knowledge extraction, and, thus, imprecise data analysis. Therefore, alerts based on keywords may be problematic because references to named entities are ambiguous and many alerts that are not on topic may be provided in the search results. In addition, people may not want to get alerted on everything related to an entity, but only when new knowledge (new information) about an entity is available.

Keyword search may not solve these problems as it is not easy to do that kind of filtration.

Therefore, there is still a need for tailored alerts following certain criteria to reduce results with misleading information or false positives, to increase the efficiency of monitoring, allowing for broadened universe of alerts.

SUMMARY

An aspect of the present disclosure is a method for entity-driven alerts based on disambiguated features. The method may include a news feed, an entity disambiguation module, and an alert database including one or more software modules.

A system for disambiguating features may include one or more modules, such as one or more feature extraction modules, one or more disambiguation modules, one or more scoring modules, and one or more linking modules. Embodiments of a method for disambiguating features may improve the accuracy of entity disambiguation beyond what may be achieved by considering no document linking. Taking account of document linkage may allow better disambiguation by considering document and entity relationships implied by links. Additionally, method for disambiguating features may be based on topics. Disambiguated features based on topics may allow to disambiguate one or more features/entities of interest occurring in a document by extracting meaningful context from a document (topics, entities, events, sentiment, and other features); and by disambiguating the extracted features by linking the co-occurrence of extracted features (topics, entities, etc.) using the knowledge base of co-occurring features.

The components within alert database (AD) may vary according to the type of alert the user wants to receive. The AD may have at least the components discussed below.

According to various embodiments, the AD may have a user identifier to which the alerts may be going to be sent; a collection of disambiguated features from which the user may select which feature the user wants to monitor; an alert specification describing the type of alert the user wants to receive; and a known-knowledge base in which known knowledge about the feature of interest may be stored. Any suitable methods may be employed for the user to communicate to the system which feature is of interest. According to other embodiments, AD may include other components such as a module that keeps record of the number or volume, and average of documents related to the feature of interest, in the case that the type of alert that the user chooses is based on trends emerging of the feature of interest.

Another aspect of the present disclosure may be an alerting system based on new knowledge discovered about a feature of interest, where an alert may be sent to a user when new information or new knowledge (for instance, new topics or frequently co-occurring entities) about the feature of interest is discovered.

Another aspect of the present disclosure may be an alerting system based on new associations between a feature and the feature of interest, where an alert may be sent to a user when new types of association are found between features and the feature of interest.

Another aspect of the present disclosure may be an alerting system based on new trends emerging about a feature of interest, where an alert may be sent to a user when detecting new trending changes on number of occurrences for the feature of interest. Trending changes may include changes in the number of documents (considered as the number of documents mentioned per day/week, depending on the user specifications), changes in the average of the number of documents per day, and changes in the number of occurrences, among others.

By using entity disambiguation for the alert systems, documents may be accurately determined to be associated with the entity of interest, allowing the systems to alert users when new information about a feature is available, but only when it is about the correct feature of interest; i.e., the disclosed method eliminates alerts on documents that mention a different feature with the same name.

According to various embodiments, method for entity-driven alerts based on disambiguated features may reduce the number of false positives resulting from a state of the art search queries. This in turn, may increase the efficiency of monitoring, allowing for a broadened universe of alerts.

In one embodiment, a computer-implemented method comprises disambiguating, by a disambiguation computer, a document feature from an electronic document by way of extracting, by a feature extraction computer, the document feature from the electronic document, and linking, by a linking computer, the extracted document feature to one or more document features stored in a knowledge database of co-occurring document features of a plurality of electronic documents; assigning, by a scoring computer, to the disambiguated document feature a confidence score indicative of a level of confidence associated with a degree of disambiguation of the document feature; and adding, by an in-memory database computer, the disambiguated document feature to the knowledge database of co-occurring document features when the disambiguated document feature matches a document feature of interest in an alert database based at least in part on the confidence score.

In another embodiment, a system comprises a disambiguation computer configured to disambiguate a document feature from an electronic document by being further configured to extract a document feature from an electronic document, and link the extracted document feature to one or more document features stored in a knowledge database of co-occurring document features of a plurality of electronic documents; a scoring computer configured to assign to the disambiguated document feature a confidence score indicative of a level of confidence associated with a degree of disambiguation of the document feature; and an in-memory database computer configured to add the disambiguated document feature to the knowledge database of co-occurring document features when the disambiguated document feature matches a document feature of interest in an alert database based at least in part on the confidence score.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DEFINITIONS

As used herein, the following terms have the following definitions:

"Database" refers to any system including any combination of clusters and modules suitable for storing one or more collections and suitable to process one or more queries.

"Document" refers to a discrete electronic representation of information having a start and end.

"Corpus" refers to a collection of one or more documents.

"Feature" refers to any information which is at least partially derived from a document.

"Feature attribute" refers to metadata associated with a feature; for example, location of a feature in a document, confidence score, among others.

"Feature extraction" refers to information processing methods for extracting information such as names, places, and organizations.

"Fact" refers to objective relationships between features.

"Knowledge Base" refers to a base containing features/entities.

"Live corpus", or "Document Stream", refers to a corpus that is constantly fed as new documents are uploaded into a network.

"Memory" refers to any hardware component suitable for storing information and retrieving said information at a sufficiently high speed.

"In-Memory Database", or "MEMDB", refers to a database in which all records are stored in memory.

"Module" refers to a computer hardware or software components suitable for carrying out at least one or more tasks.

"Link on-the-fly module" refers to any linking module that performs data linkage as data is requested from the system rather than as data is added to the system.

"Topic" refers to a set of thematic information which is at least partially derived from a corpus.

"Topic Model" refers to a hypothetical description of a complex entity or process.

"Query" refers to a request to retrieve information from one or more suitable databases.

DETAILED DESCRIPTION

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

The present disclosure describes a method for entity-driven alerts based on disambiguated features. According to various embodiments, the disclosed method for entity-driven alerts may be based on different filters based on criteria specified by a user, who is interested in receiving information about a feature of interest. The criteria may include restrictions, such as new knowledge of a disambiguated feature, new associations with the disambiguated feature, or new trends about the disambiguated feature, among others.

According to various embodiments, disambiguated features, on which method for entity-driven alerts is based, may be disambiguated by a plurality of suitable methods. According to one embodiment, a system for disambiguating features may include multiple computer modules, such as one or more feature extraction modules, one or more disambiguation modules, one or more scoring modules, and one or more linking modules. The method for disambiguating features may improve the accuracy of entity disambiguation beyond what may be achieved by considering no document linking. Taking account of document linkage may allow better disambiguation by considering document and entity relationships implied by links.

According to various embodiments, the types of features extracted by the method for disambiguating features may include topic IDs, employing multiple modules to combine extracted entities. The topics may be machine generated (not human generated), thus, may be derived directly from a corpus.

According to one embodiment, the disclosed method may identify topic relatedness of new and existing topic IDs employing one or more disambiguating modules including one or more disambiguating algorithms, forming a normalized set of topic IDs.

According to various embodiments, the disclosed method may include a construction of a knowledge base to extract meaningful context from each document in a massive corpus using multiple topic models with differing levels of granularity to classify documents to topics, feature and entity extraction, event extraction, fact extraction, and sentiment extraction, among others.

Disambiguated features based on topics may allow to disambiguate one or more features/entity of interest occurring in a document by extracting meaningful context from a document (topics, entities, events, sentiment, and other features); and by disambiguating the extracted features by linking the co-occurrence of extracted features (topics, entities, etc.) using the knowledge base of co-occurring features.

Thus, the disclosed method may have an improved accuracy of feature disambiguation by establishing more accurate relationships between entities and documents, by considering only the entities which occur closer in text to the link location in the source document. This may increase the possibility of deriving useful relationships from long documents having many entities, which would complicate a typical entity disambiguation algorithm by introducing a large number of irrelevant co-occurrences. Similarly, the method may potentially handle documents that have occurrences of entities with different disambiguation. The disambiguation algorithm may generate different associations for different features. In some embodiments, computers of the in-memory database are configured to add disambiguated document features to a knowledge database, which contains co-occurring document features, based at least in part on a distance in text from a link location in the electronic document.

An alert mechanism's novelty can be based on "disambiguated features" that a user can specify around an already existing and disambiguated feature of interest (can be any feature such as entities, topics, etc.) in the knowledge base. Conventional alert systems may be based on keyword search alert mechanisms, wherein a "disambiguated feature" guides the alert, providing better relevance and precision. The alert mechanism described herein can provide a way to detect and communicate emerging trends related to a "feature of interest," new associations to the "feature of interest," and new knowledge discovered to the "feature of interest," besides just a group of documents that mention the "feature of interest." The methods can also provide a system-wide knowledge base update process by support of dynamic on-the-fly-linking mechanism in an in-memory database based on an individual user's alert query. Thus, this feature can provide a framework to support collaborative knowledge sharing among different users in a given system establishment.

System for Disambiguating Features

Figure 1:
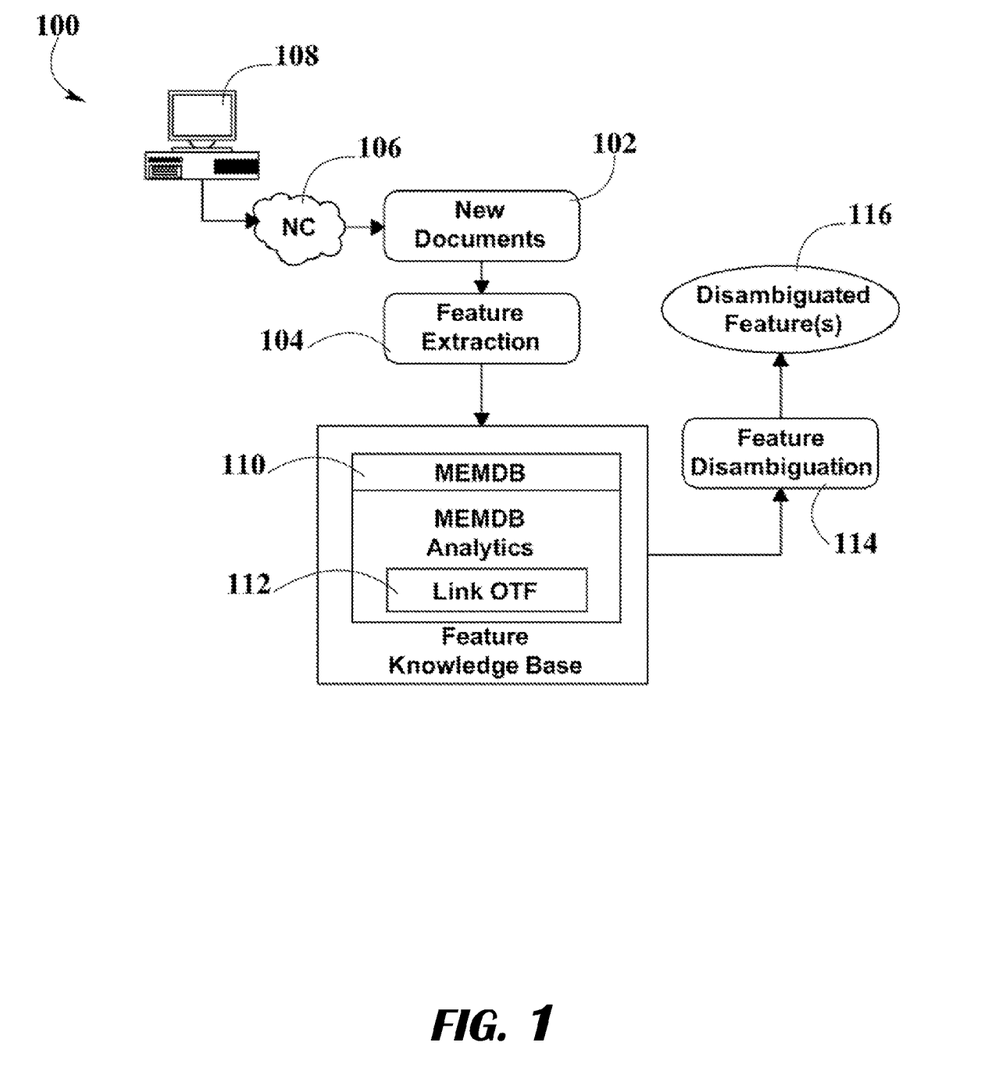
FIG. 1 is a diagram of a system for disambiguating features, according to an embodiment.

FIG. 1 is a block diagram of a system 100 for disambiguating features, according to an embodiment. In the system 100 for disambiguating features a new document 102 is input into the system, such as into a feature extraction module 104, which performs feature extraction from the document 102. The new document 102 may be fed from any suitable source, such as a massive corpus or live corpus of documents that may have a continuous input of documents, e.g. from an internet or network connection 106 (NC).

One or more feature recognition and extraction algorithms may be employed by the feature extraction module 104 to analyze the document 102. A score may be assigned to each extracted feature. The score may indicate the level of certainty of the feature being correctly extracted and linked with the correct attributes. Additionally, during feature extraction by the module 104, one or more primary features may be identified from document 102. Each primary feature may have been associated with a set of feature attributes and one or more secondary features (like proximity cluster of co-occurring features like entities).

During the process of disambiguation, the system may be constantly getting new knowledge, updated by users 108, that are not pre-linked in a static way; thus, the number of documents to be evaluated may be infinitely increasing. This may be achieved because of the use of MEMDB module 110. The MEMDB module 110 may allow to perform a faster disambiguation process, and may allow to do a Link On-the-Fly (OTF) passing through link OTF module 112, which enables to get the latest information that is going to contribute to MEMDB 110. The disclosed link OTF module 112 may be capable of constantly evaluating, scoring, linking, and clustering a feed of information.

Any suitable method for linking the features may be employed, which may essentially use a weighted model for determining which feature types are most important, which have more weight, and, based on confidence scores, determine the confidence level of feature extraction by feature extraction module 104 and confidence level of feature disambiguation by feature disambiguation module 114 with regard to the correct features. Consequently, the correct feature may go into the resulting cluster of features. As more nodes are working in parallel, the process may be more efficient. The result of all process aforementioned may be output as one or more newly disambiguated features 116.

By using feature disambiguation modules, documents may be accurately determined to be associated with the entity of interest, which may allow the system to alert users when new information about an feature is available but only when it is about the correct feature of interest.

After feature disambiguation 114 of new document 102 has been made, the extracted new features may be included in MEMDB 110 to pass through link OTF module 112; where the features may be compared and linked, and an ID of disambiguated feature 116 may be returned to a user as a result from a query. In addition to the ID, the resulting feature cluster defining the disambiguated feature 116, may optionally be returned.

Once features are disambiguated the number of alerts to be sent to a user may be further reduced by letting the user specify addition restrictions.

Disambiguated features 116 may then be included in an Alert Database (AD). Components within AD may vary according to the type of alert the user wants to receive. The AD may have at least the following components.

TABLE 1

Alert database.

| User ID | Feature of Interest | Alert Specifications | Known-Knowledge Base |
|---------|---------------------|----------------------|----------------------|
|         |                     |                      |                      |

According to various embodiments, the AD may have a user identifier to which the alerts may be going to be sent; a collection of disambiguated features from which the user may select which feature wants to monitor; an alert specification describing the type of alert the user wants to receive; and a known-knowledge base on which known knowledge about the feature of interest may be stored. Any suitable methods may be employed for the user to communicate to the system which is the feature of interest.

According to various embodiments, a feature of interest may include a person, a phone number, a place, a company, among others.

The types of alert the user may select from may include alerts by e-mail, phone number, or other type of feature to which the system may reach the user.

According to one embodiment, known-knowledge base may be stored in another MEMDB. Known-knowledge base may have any suitable structure, which may be processed by any suitable algorithms, such as associated topics, proximity cluster of other feature (like entities, events), derived prominence factor (based on simple frequency counts or a weighted association with global events and importance automatically captured via a large time bound corpus), and temporally linked events, among others. Additionally, known-knowledge base may include restrictions from which the alerts may be going to be based, according to the user specifications. Knowledge within known-knowledge base may have any suitable representation, such as incremental graphs, among others.

According to an embodiment of the present disclosure, restrictions within known-knowledge base may include a selection or criteria that may be here classified as new knowledge about a feature of interest, new association with the feature of interest, and new trends emerging about the feature of interest, among others.

According to other embodiments, AD may include other components such as a module that keeps record of the number or volume, and average of documents related to the feature of interest, in the case that the type of alert that the user chooses is based on trends emerging of the feature of interest.

Alert when New Knowledge is Discovered about the Feature of Interest

After disambiguated feature 116 is obtained, disambiguated feature 116 may be sent to AD to be compared with the feature of interest previously selected by the user. If disambiguated features 116 match with the feature of interest, disambiguated features 116 are included within known-knowledge base.

Figure 2:
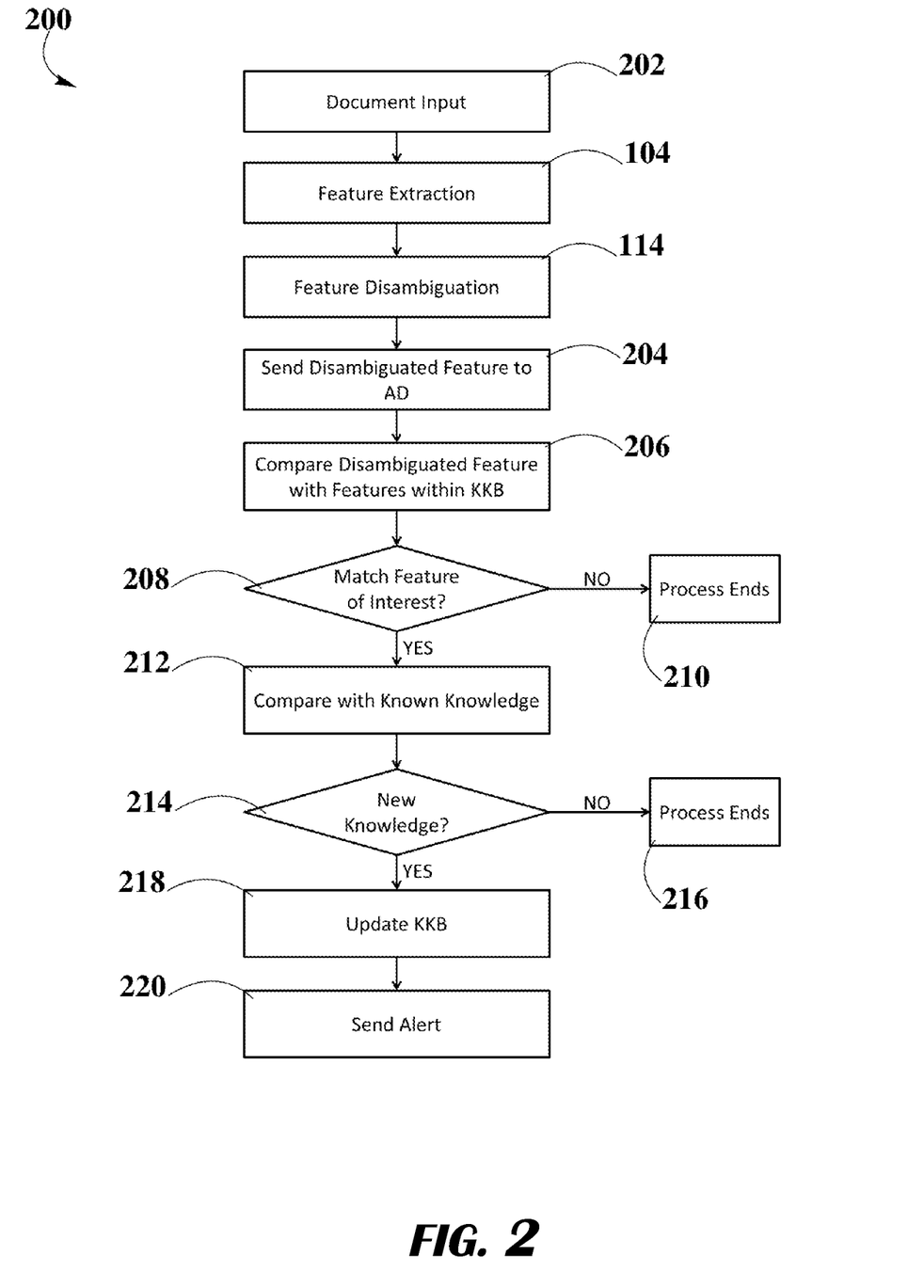
FIG. 2 is a flowchart for an alerting method based on new knowledge discovered about a feature of interest, according to an embodiment.

FIG. 2 is a flowchart of alerting method 200 based on new knowledge discovered about a feature of interest, according to one embodiment.

According to one embodiment, in step 202, when a new document is input into the system, the document is processed by a disambiguation module where features within the document are extracted 104 and disambiguated 114. In step 204, disambiguated feature 116 may be subsequently sent to the Alert Database to be compared, in step 206, with the existing knowledge included within the known-knowledge base in order to determine the relationship between disambiguated features 116 and the feature of interest. In step 208, if disambiguated feature 116 does not match the feature of interest, then the process may end 210.

If disambiguated features 116 match, step 208, the feature of interest, disambiguated features 116 are compared, in step 212, with the knowledge within known-knowledge base to determine if there is a match between the new features and the already extracted features that form part of the known-knowledge base, for example, if an alert has already been sent about that knowledge. If the is no new knowledge, step 214, the process may end, step 216. If, in step 214, new knowledge is found, the known-knowledge base is updated, step 218, and an alert is sent, step 220, to the user by the specified notification method, for example email or mobile device messaging, among others.

Alert when the Feature of Interest has a New Association to New Features

Figure 3:
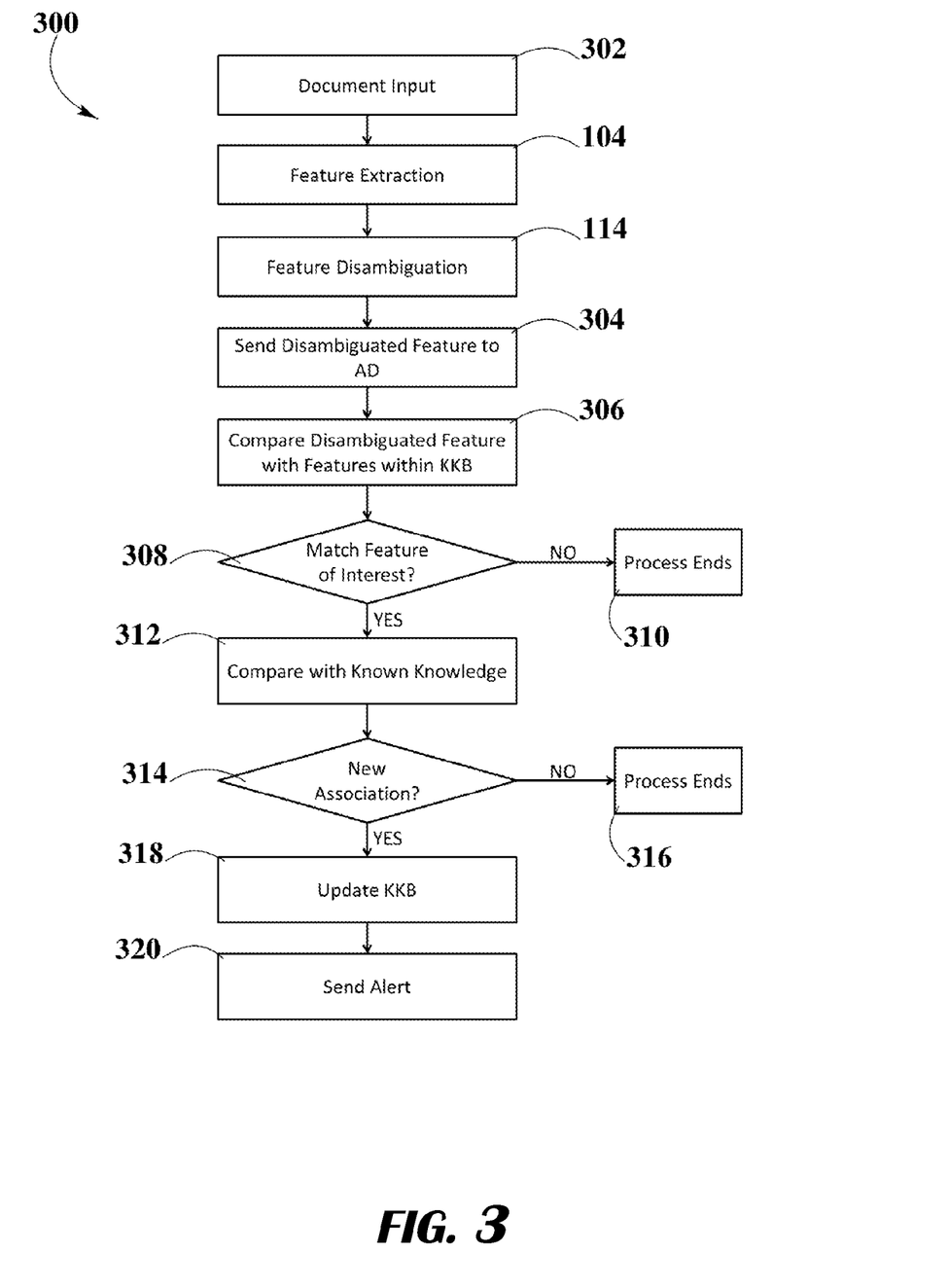
FIG. 3 is a flowchart for an alerting method based on new associations with a feature of interest, according to an embodiment.

After disambiguated feature 116 is obtained, disambiguated feature 116 may be sent to AD to be compared with the feature of interest previously selected by the user. If disambiguated features 116 match with the feature of interest, disambiguated features 116 are included within known-knowledge base.

FIG. 3 is a flowchart of alerting method 300 based on new association discovered about the feature of interest, according to one embodiment.

According to one embodiment, when a new document is input, step 302, into the system, the document is processed by a disambiguation module where features within the document are extracted 104 and disambiguated 114. Disambiguated feature 116 may be subsequently sent, step 304, to the Alert Database to be compared, step 306, with the existing knowledge included within the known-knowledge base in order to determine if there is an association between disambiguated features 116 and the feature of interest. If disambiguated feature 116 does not match, step 308, the feature of interest, then the process ends in step 310.

If disambiguated features 116 match, in step 308, the feature of interest, disambiguated features 116 are compared, step 312, with the knowledge within known-knowledge base to determine if there is a match between the new features and the already extracted features that form part of the known-knowledge base, for example, if an alert has already been sent about that knowledge. If the is no new association, step 314, the process ends, step 316. If new association in step 314 is found, the known-knowledge base is updated in step 318 and an alert is sent in step 320 to the user by the specified notification method, for example email or mobile device messaging, among others.

Alert when New Trends about the Feature of Interest Emerge

Figure 4:
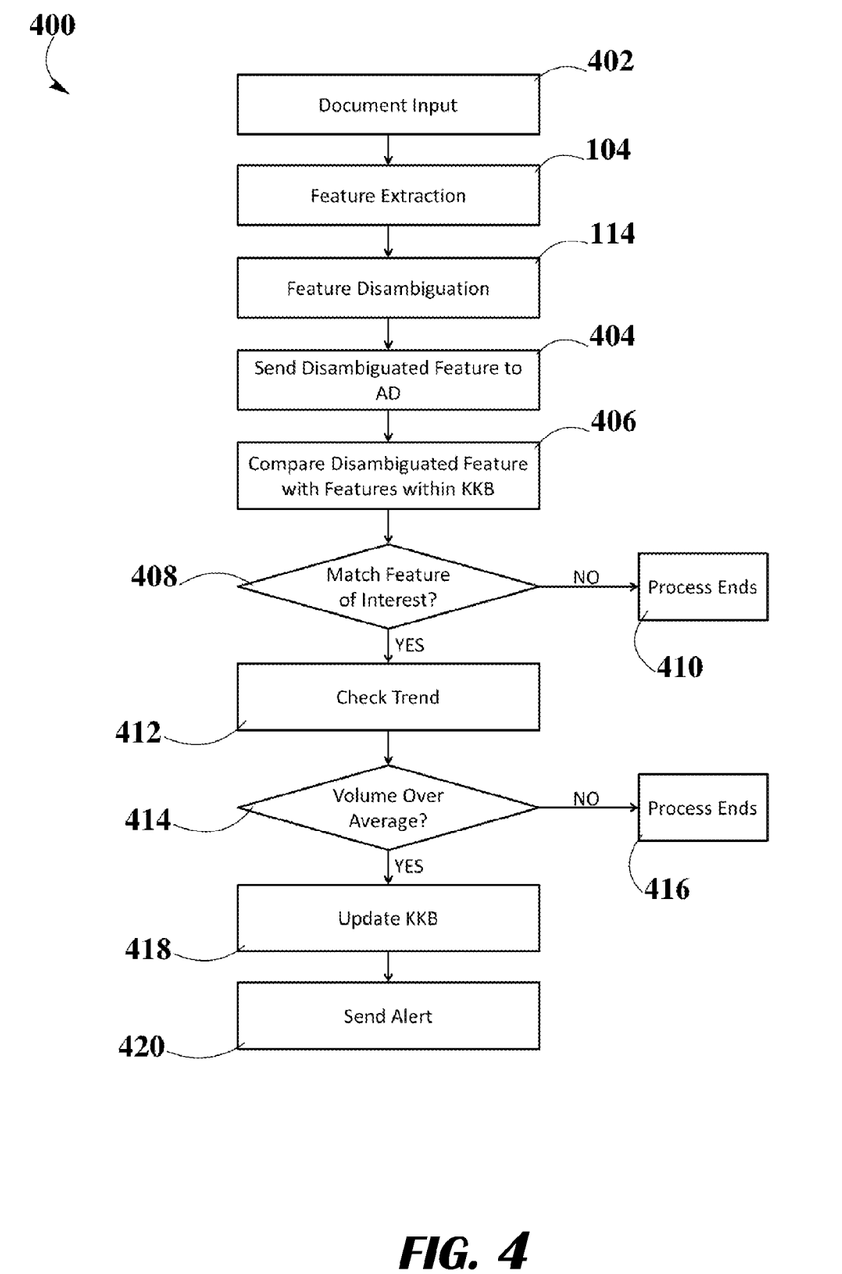
FIG. 4 is a flowchart for an alerting method based on new trends emerging about a feature of interest, according to an embodiment.

After disambiguated feature 116 is obtained, disambiguated feature 116 may be sent to AD to be compared with the feature of interest previously selected by the user. If disambiguated features 116 match with the feature of interest, disambiguated features 116 are included within known-knowledge base.

FIG. 4 is a flowchart of alerting method 400 based on new trends emerging about the feature of interest, according to one embodiment.

According to one embodiment, when a new document is input, in step 402, into the system, the document is processed by a disambiguation module where features within the document are extracted 104 and disambiguated 114. Disambiguated feature 116 may be subsequently sent, in step 404, to the Alert Database to be compared, in step 406, with the existing knowledge included within the known-knowledge base in order to determine if there is an association between disambiguated features 116 and the feature of interest. If in step 408, the disambiguated feature 116 does not match the feature of interest, then the process may end, step 410.

If disambiguated features 116 match, step 308, the feature of interest, the documents including disambiguated features 116 of interest are accounted and an indicator of the total amount of such documents are stored in the Alert Database to check, in step 412, if the volume of documents about the feature of interest is greater than the daily average. If the volume of documents is not greater, step 414, than the average, the process may end, step 416. If the volume of documents is greater, step 414, than the average, the known-knowledge base is updated, step 418, and an alert is sent, in step 420, to the user by the specified notification method, for example email or mobile device messaging, among others.

According to one embodiment, the volume may be considered as the number of documents mentioned per day, week, or month, among other, depending on the user specifications.

According to other embodiments, the volume may be considered as the number of occurrences of the feature of interest.

According to various embodiments, method for entity-driven alerts based on disambiguated features may reduce the number of false positives resulting from a state of the art search queries. This in turn, may increase the efficiency of monitoring, allowing for a broadened universe of alerts.

Example #1 is an embodiment of alerting method 200, where a user is interested in finding new knowledge about John Doe, the football player. In this embodiment, the known knowledge is that John Doe appears in sports magazines; but, after applying a method for disambiguation features, a new document input, in step 202, where the same John Doe appears on an economic magazine is found. As the known-knowledge base has no records of this John Doe appearing on economic magazines, an alert is sent 220 to the user.

Example #2 is an embodiment of alerting method 300, where a user is interested in finding new associations with John Doe, the musician. In this embodiment, the known knowledge is that John Doe has been associated to music concerts and to a music company named "Re"; but, after applying a disambiguation method, a new document input, in step 302, where the same John Doe is associated with a music company named "Fa" is found. As the known-knowledge base has no records of this John Doe association with "Fa," an alert is sent, in step 320, to the user.

Example #3 is an embodiment of alerting method 400, where a user is interested in keeping track of the trend changes in documents about John Doe, an environmental activist. In this embodiment, the known knowledge is that the average number of documents mentioning the same John Doe is 50; but, after applying a disambiguation method and employing the AD to monitor the total mentions of the same John Doe per day, the average of mentions on the third they of monitoring has been calculated to be 80. As the average of mentions in the third day is greater than the average of mentions during the past days, an alert is sent, in step 420, to the user.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A computer-implemented method comprising:
 disambiguating, by a disambiguation computer, a document feature from an electronic document by way of:
  extracting, by a feature extraction computer, the document feature from the electronic document, and
  linking, by a linking computer, the extracted document feature to one or more document features stored in a knowledge database of co-occurring document features of a plurality of electronic documents;
 assigning, by a scoring computer, to the disambiguated document feature a confidence score indicative of a level of confidence associated with a degree of disambiguation of the document feature;
 adding, by an in-memory database computer, the disambiguated document feature to the knowledge database of co-occurring document features when the disambiguated document feature matches a document feature of interest in an alert database based at least in part on the confidence score, the alert database storing one or more records of one or more features of interest, each respective record indicating one or more disambiguated features in the knowledgebase database matching the feature of interest;
 generating, by the in-memory database computer, a notification containing an alert formulated by the in-memory database computer according to one or more alert specifications in the record of the feature for the feature of interest; and
 adding, by the in-memory database computer, the disambiguated document feature to the knowledge database of co-occurring document features based at least in part on a distance in text from a link location in the electronic document, wherein the distance is based on a closeness in text to the link location in the electronic document.

2. The method of claim 1, further comprising sending the alert to a user device when the disambiguated document feature is indicative of new information in the knowledge database of co-occurring document features.

3. The method of claim 1, further comprising sending an alert to a user device when the disambiguated document feature is indicative of a new association with one or more features in the knowledge database of co-occurring document features.

4. The method of claim 1, further comprising sending an alert to a user device when a volume of documents associated with the disambiguated feature meets or exceeds a predetermined threshold.

5. The method of claim 4, wherein the predetermined threshold is a daily average number of documents associated with the disambiguated feature.

6. The method of claim 1, wherein the disambiguated document feature is selected from the group consisting of a topic, a document entity, an event, and a sentiment.

7. The method of claim 1, further comprising associating, via the feature extraction computer module, one or more attributes with the document feature.

8. A system comprising:
 a disambiguation computer configured to disambiguate a document feature from an electronic document by being further configured to extract a document feature from an electronic document, and link the extracted document feature to one or more document features stored in a knowledge database of co-occurring document features of a plurality of electronic documents;
 a scoring computer configured to assign to the disambiguated document feature a confidence score indicative of a level of confidence associated with a degree of disambiguation of the document feature;
 an alert database comprising non-transitory machine-readable storage media configured to store one or more records of one or more features of interest, each respective record indicating one or more disambiguated features in the knowledgebase database matching one or more feature of interests; and
 an in-memory database computer configured to add the disambiguated document feature to the knowledge database of co-occurring document features when the disambiguated document feature matches a document feature of interest in an alert database based at least in part on the confidence score, the in-memory database computer further configured to generate a notification containing an alert formulated according to one or more alert specifications contained in the record for the feature of interest,
 wherein the in-memory database computer is further configured to add the disambiguated document feature to the knowledge database of co-occurring document features based at least in part on a distance in text from a link location in the electronic document, wherein the distance is based on a closeness in text to the link location in the electronic document.

9. The system of claim 8, wherein the in-memory database computer is configured to send the alert to a user device when the disambiguated document feature is indicative of new information in the knowledge database of co-occurring document features.

10. The system of claim 8, wherein the in-memory database computer is configured to send an alert to a user device when the disambiguated document feature is indicative of a new association with one or more features in the knowledge database of co-occurring document features.

11. The system of claim 8, wherein the in-memory database computer is configured to send an alert to a user device when a volume of documents associated with the disambiguated feature meets or exceeds a predetermined threshold.

12. The system of claim 11, wherein the predetermined threshold is a daily average number of documents associated with the disambiguated feature.

13. The system of claim 8, wherein the disambiguated document feature is selected from the group consisting of a topic, a document entity, an event, and a sentiment.

14. The system of claim 8, wherein the disambiguation computer module is further configured to associate one or more attributes with the document feature.

* * * * *